(12) United States Patent
Rastogi

(10) Patent No.: US 11,303,588 B1
(45) Date of Patent: Apr. 12, 2022

(54) AUTOMATING A RESPONSE TO A MESSAGE COMMUNICATED TO A BUSINESS ENTITY VIA AN ONLINE MESSAGING APPLICATION

(71) Applicant: Meta Platforms, Inc., Menlo Park, CA (US)

(72) Inventor: Vibhor Rastogi, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/562,209

(22) Filed: Sep. 5, 2019

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 51/02* | (2022.01) | |
| *G06N 3/08* | (2006.01) | |
| *H04L 51/52* | (2022.01) | |
| *G06F 40/30* | (2020.01) | |

(52) U.S. Cl.
CPC ............. *H04L 51/02* (2013.01); *G06F 40/30* (2020.01); *G06N 3/08* (2013.01); *H04L 51/32* (2013.01)

(58) Field of Classification Search
CPC ......... H04L 51/02; H04L 51/32; G06F 40/30; G06N 3/08
USPC ....................................................... 709/206
See application file for complete search history.

(56) References Cited

U.S. PATENT DOCUMENTS

| | | | | |
|---|---|---|---|---|
| 8,996,639 | B1* | 3/2015 | Faaborg | H04L 51/02 |
| | | | | 709/206 |
| 9,736,268 | B1* | 8/2017 | Tsay | H04L 67/327 |
| 10,162,853 | B2* | 12/2018 | Venkataraman | G10L 15/22 |
| 10,404,636 | B2* | 9/2019 | Rodriguez | H04L 65/60 |
| 10,504,508 | B2* | 12/2019 | Fujii | G10L 15/22 |
| 10,515,155 | B2* | 12/2019 | Bachrach | G06N 3/0454 |
| 10,534,788 | B2* | 1/2020 | Agarwal | G06F 3/0484 |
| 10,599,391 | B2* | 3/2020 | Mailey | G06F 40/205 |
| 10,608,966 | B1* | 3/2020 | Landowski | G06F 40/295 |
| 10,614,056 | B2* | 4/2020 | Ignatyev | G06N 5/003 |
| 10,629,089 | B2* | 4/2020 | Ahn | G09B 5/12 |
| 10,749,819 | B2* | 8/2020 | Zappacosta | H04L 51/02 |
| 2002/0194307 | A1* | 12/2002 | Anderson | H04L 63/1408 |
| | | | | 709/219 |
| 2004/0068490 | A1* | 4/2004 | Guibord | G06F 16/951 |
| 2008/0273706 | A1* | 11/2008 | Noll | H04L 63/06 |
| | | | | 380/279 |

(Continued)

*Primary Examiner* — Hamza N Algibhah
(74) *Attorney, Agent, or Firm* — Fenwick & West LLP

(57) ABSTRACT

A request to communicate a message to a business entity via an online messaging application is received from a user of the online messaging application. An intent of the user is extracted by applying a set of natural language processing techniques to the message and a set of template responses associated with the business entity is retrieved. The intent of the user is mapped to a template response included among the set of template responses and the template response is sent for display to the user. The template response may be communicated to an administrator of an account associated with the business entity and sent for display to the user in response to receiving a request from the administrator to do so. One or more of these steps may be performed at the online messaging application or at a client device associated with the user or the business entity.

20 Claims, 3 Drawing Sheets

(56) References Cited

U.S. PATENT DOCUMENTS

| | | | |
|---|---|---|---|
| 2016/0241389 A1* | 8/2016 | Le Saint | H04L 9/14 |
| 2016/0337321 A1* | 11/2016 | Lin | H04L 9/3263 |
| 2017/0222961 A1* | 8/2017 | Beach | H04L 51/02 |
| 2017/0236060 A1* | 8/2017 | Ignatyev | G06N 20/00 |
| | | | 706/46 |
| 2017/0295018 A1* | 10/2017 | Whitehouse | H04L 63/10 |
| 2017/0302613 A1* | 10/2017 | Imbrie | H04L 51/32 |
| 2018/0083901 A1* | 3/2018 | McGregor, Jr. | H04L 51/32 |
| 2018/0227250 A1* | 8/2018 | Zappacosta | H04L 67/306 |
| 2018/0329987 A1* | 11/2018 | Tata | G06N 3/08 |
| 2018/0337918 A1* | 11/2018 | Chang | G06F 3/04812 |
| 2018/0367483 A1* | 12/2018 | Rodriguez | H04L 51/046 |
| 2018/0367484 A1* | 12/2018 | Rodriguez | H04L 51/02 |
| 2019/0043106 A1* | 2/2019 | Talmor | G06N 3/006 |
| 2019/0251165 A1* | 8/2019 | Bachrach | G06F 40/30 |
| 2019/0311305 A1* | 10/2019 | Lee | G06N 5/04 |
| 2020/0125901 A1* | 4/2020 | Pelov | G06K 9/6282 |
| 2020/0387550 A1* | 12/2020 | Cappetta | G06F 16/9538 |

\* cited by examiner

AUTOMATING A RESPONSE TO A MESSAGE COMMUNICATED TO A BUSINESS ENTITY VIA AN ONLINE MESSAGING APPLICATION

TECHNICAL FIELD

This disclosure relates generally to online messaging applications, and more specifically to automating a response to a message communicated to a business entity via an online messaging application.

BACKGROUND

Online messaging applications allow their users to communicate by sending messages to each other via the online messaging applications. An online messaging application may allow a business entity to have a presence on the online messaging application, such that messages may be communicated to and from the business entity via the online messaging application. An administrator of an account associated with a business entity maintained in an online messaging application may respond to messages sent to the business entity from users of the online messaging application. For example, if a message sent to a business entity from a user of an online messaging application includes a request for information associated with the business entity, an administrator of an account associated with the business entity maintained in the online messaging application may send a message to the user on behalf of the business entity that responds to the request.

Relative to other types of communication, such as email, users of online messaging applications conventionally expect a lower latency of response (i.e., a shorter time period between the time that they send messages via the online messaging applications and the time that they receive responses to the messages). Although messages communicated to a business entity via an online messaging application often include the same types of inquiries (e.g., inquiries about the business entity's contact information, business hours, products or services, etc.), the business entity may receive several messages simultaneously from multiple users of the online messaging application. Due to the number of messages that may be communicated to the business entity via the online messaging application, it may be difficult for an administrator of an account associated with the business entity to respond to the messages within the time period expected by the users from whom the messages were received, which may result in degradation of user experience.

SUMMARY

Online messaging applications allow their users to communicate by sending messages to each other via the online messaging applications. Messages may be communicated to and from a business entity via an online messaging application if the business entity has a presence on the online messaging application. Although users of online messaging applications conventionally expect a lower latency of response relative to other types of communication, such as email, since a business entity may receive several messages simultaneously via an online messaging application, an administrator of an account associated with the business entity may be unable to respond to the messages within the time period expected by the users.

Since messages communicated to a business entity via an online messaging application often include the same types of inquiries (e.g., inquiries about the business entity's contact information, business hours, products or services, etc.), responses to messages sent to the business entity via the online messaging application may be automated through the use of template responses. More specifically, to automate responses from a business entity to messages sent to the business entity via an online messaging application, when a request is received to communicate a message via the online messaging application from a user of the online messaging application to the business entity, an intent of the user is extracted by applying a set of natural language processing techniques to the message. A set of template responses associated with the business entity is retrieved and the intent of the user is mapped to a template response included among the set of template responses. This template response is then sent for display to the user, such that this process may be fully automated. In some embodiments in which this process is not fully automated, the template response may be communicated to an administrator of an account associated with the business entity maintained in the online messaging application and sent for display to the user in response to receiving a request from the administrator to do so. One or more of these steps may be performed at a client device associated with the user or the business entity or at the online messaging application.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
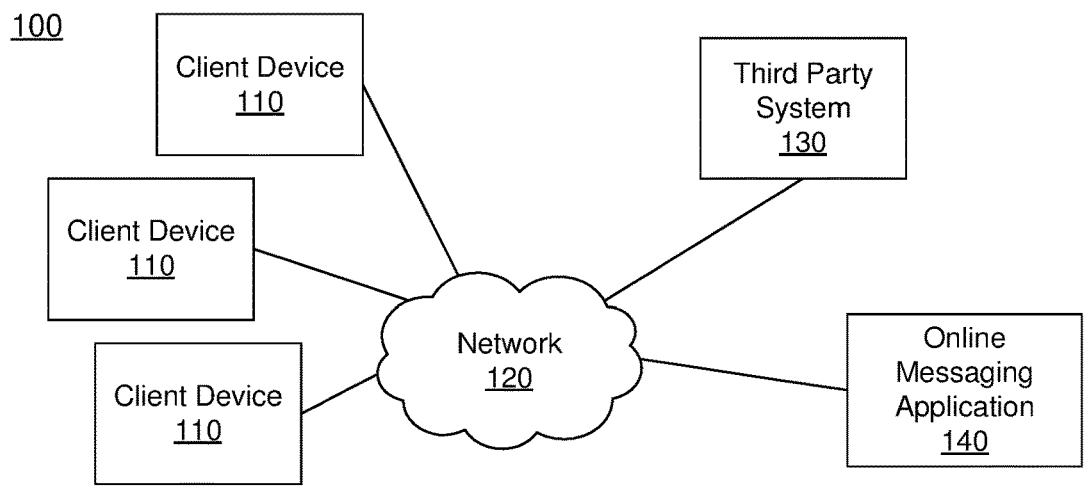
FIG. 1 is a block diagram of a system environment in which an online messaging application operates, in accordance with an embodiment.

FIG. 1 is a block diagram of a system environment 100 for an online messaging application 140. The system environment 100 shown by FIG. 1 comprises one or more client devices 110, a network 120, one or more third-party systems 130, and the online messaging application 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online messaging application 140. For example, a client device 110 executes a browser application to enable interaction between the client device 110 and the online messaging application 140 via the network 120. In another embodiment, a client device 110 interacts with the online messaging application 140 through an application programming interface (API) running on a native operating system of the client device 110, such as IOS® or ANDROID™

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online messaging application 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online messaging application 140, such as advertisements, content, or information about an application provided by the third-party system 130.

Figure 2:
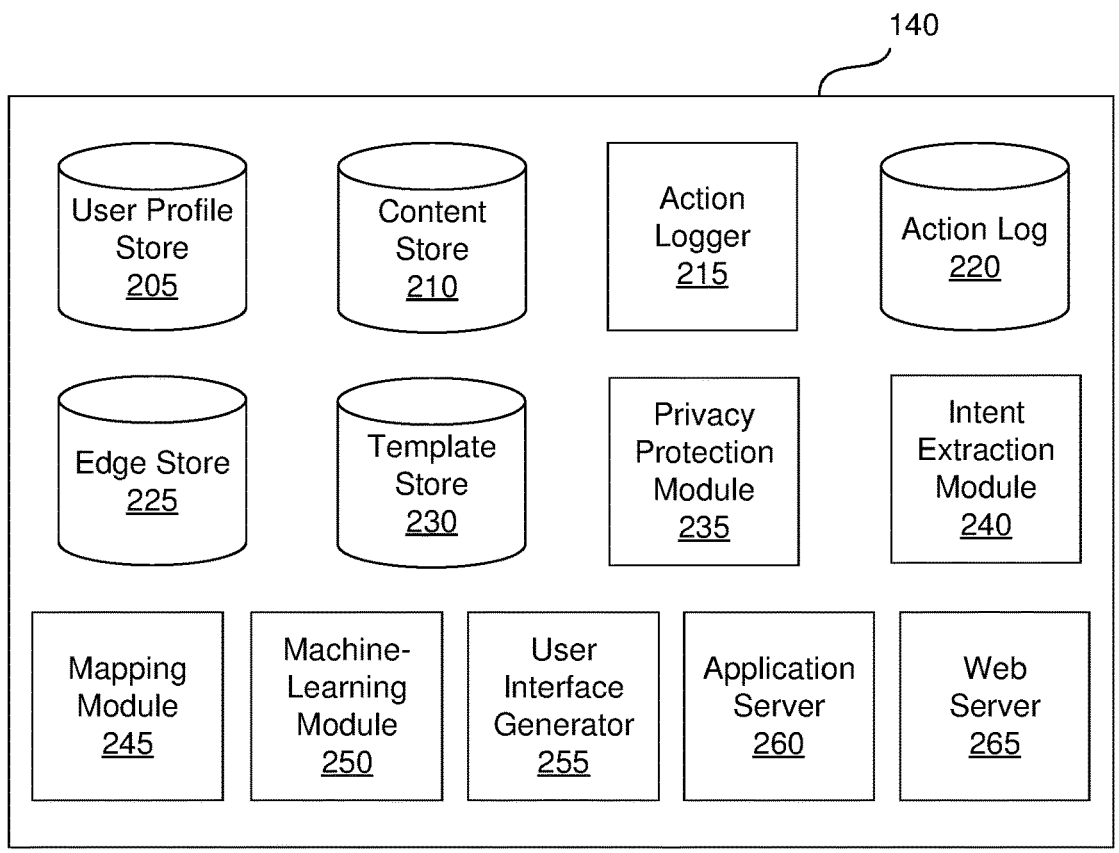
FIG. 2 is a block diagram of an online messaging application, in accordance with an embodiment.

FIG. 2 is a block diagram of an architecture of the online messaging application 140. The online messaging application 140 shown in FIG. 2 includes a user profile store 205, a content store 210, an action logger 215, an action log 220, an edge store 225, a template store 230, a privacy protection module 235, an intent extraction module 240, a mapping module 245, a machine-learning module 250, a user interface generator 255, an application server 260, and a web server 265. In other embodiments, the online messaging application 140 may include additional, fewer, or different components for various applications. Conventional components such as network interfaces, security functions, load balancers, failover servers, management and network operations consoles, and the like are not shown so as to not obscure the details of the system architecture.

Each user of the online messaging application 140 is associated with a user profile, which is stored in the user profile store 205. A user profile includes declarative information about the user that was explicitly shared by the user and also may include profile information inferred by the online messaging application 140. In one embodiment, a user profile includes multiple data fields, each describing one or more attributes of the corresponding user of the online messaging application 140. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the users of the online messaging application 140 displayed in an image, with information identifying the images in which a user is tagged stored in the user profile of the user. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online messaging application 140, user profiles also may be stored for entities such as businesses or organizations. This allows an entity to establish a presence on the online messaging application 140 for connecting and exchanging content with other users of the online messaging application 140. The entity may post information about itself, about its products or provide other information to users of the online messaging application 140 using a brand page associated with the entity's user profile. Other users of the online messaging application 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Users of the online messaging application 140 may create objects stored by the content store 210, such as status updates, photos tagged by users to be associated with other objects in the online messaging application 140, events, groups or applications. In some embodiments, objects are received from third-party applications or third-party applications separate from the online messaging application 140. In one embodiment, objects in the content store 210 represent single pieces of content, or content "items." Hence, users of the online messaging application 140 are encouraged to communicate with each other by posting text and content items of various types of media to the online messaging application 140 through various communication channels. This increases the amount of interaction of users with each other and increases the frequency with which users interact within the online messaging application 140.

The action logger 215 receives communications about user actions internal to and/or external to the online messaging application 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online messaging application 140 to track user actions in the online messaging application 140, as well as actions in third-party systems 130 that communicate information to the online messaging application 140. Users may interact with various objects in the online messaging application 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online messaging application 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online messaging application 140 as well as with other applications communicating with the online messaging application 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online messaging application 140. For example, an e-commerce website may recognize a user of an online messaging application 140 through a social plug-in enabling the e-commerce website to identify the user of the online messaging application 140. Because users of the online messaging application 140 are uniquely identifiable, e-commerce websites, such as in the preceding example, may communicate information about a user's actions outside of the online messaging application 140 to the online messaging application 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online messaging application 140.

In one embodiment, the edge store 225 stores information describing connections between users and other objects in the online messaging application 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online messaging application 140, such as expressing interest in a page in the online messaging application 140, sharing a link with other users of the online messaging application 140, and commenting on posts made by other users of the online messaging application 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online messaging application 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online messaging application 140 over time to approximate a user's interest in an object or in another user in the online messaging application 140 based on the actions performed by the user. A user's affinity may be computed by the online messaging application 140 over time to approximate the user's interest in an object, a topic, or another user in the online messaging application 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The template store 230 stores one or more sets of template responses associated with one or more business entities having a presence on the online messaging application 140. Each set of template responses may be stored in the template store 230 in association with information identifying a business entity with which it is associated. In some embodiments, each template response associated with a business entity is associated with a type of inquiry to which an intent of a user of the online messaging application 140 may be mapped. Examples of types of inquiries associated with a business entity that may be associated with a template response include inquiries about the business entity's business hours, products or services, contact information, return and exchange policy, etc.

In some embodiments, one or more template responses stored in the template store 230 may be generated by the online messaging application 140 and/or by a business entity associated with the template response(s) based on various types of business information associated with the business entity. Examples of business information associated with a business entity include contact information for the business entity, business hours for the business entity, a catalog describing a set of services and/or a set of products provided by the business entity, etc. A set of business information associated with a business entity may be retrieved from various sources (e.g., a webpage associated with the business entity, a user profile associated with the business entity maintained in the user profile store 205, etc.). For example, suppose that a template response is associated with an inquiry about details related to a product provided by a business entity. In this example, the template response may include placeholders into which the name of the product and details about the product may be inserted, such that the response may state: "Thank you for your inquiry about the <insert product name here>. Here are more details about the <insert product name here>: <insert product details here>." In this example, the name of the product and the details about the product may be retrieved from a webpage associated with the business entity and inserted in the place of the <insert product name here> and the <insert product details here> placeholders, respectively. The template store 230 is further described below in conjunction with FIG. 3.

To protect the privacy of users of the online messaging application 140 and/or business entities having a presence on the online messaging application 140, the privacy protection module 235 may allow messages communicated between the users and/or the business entities to be encrypted. In some embodiments, the privacy protection module 235 may allow the messages to be encrypted via end-to-end encryption to prevent third-parties (e.g., Internet service providers, hackers, etc.) from reading or modifying the content of messages sent between the users and/or the business entities. For example, suppose that a user of the online messaging application 140 and a business entity having a presence on the online messaging application 140 are communicating with each other. In this example, the privacy protection module 235 may generate cryptographic keys stored exclusively at a client device 110 associated with the user and at a client device 110 associated with the business entity so that messages sent between the user and the business entity may be encrypted or decrypted only at the client devices 110. The functionality of the privacy protection module 235 is further described below in conjunction with FIG. 3.

The intent extraction module 240 extracts (e.g., as shown in step 315 of FIG. 3) an intent of a user of the online messaging application 140 by applying a set of natural language processing techniques to a message to be communicated from the user to a business entity having a presence on the online messaging application 140. In some embodiments, the intent of the user may be extracted by the intent extraction module 240 using a machine-learning model, such as a deep learning model (e.g., a convolutional neural network). In such embodiments, the intent extraction module 240 may provide a set of inputs associated with the message to the model, which then determines a type of inquiry corresponding to the message. Furthermore, in such embodiments, the set of inputs associated with the message may correspond to a set of embeddings. For example, a set of embeddings corresponding to words in a message may be generated using a word embedding algorithm (e.g., Word2Vec) that processes the words in the message and generates embeddings corresponding to the words. In this example, the set of embeddings may then be provided as a set of inputs to a neural network that predicts a likelihood that the intent of a user from whom the message was received corresponds to a particular type of inquiry. Alternatively, in the above example, the output of the neural network or the output of a layer of the neural network may be an embedding that corresponds to an intent of the user. In this example, an additional layer of the neural network or a different model may compare the embedding to additional embeddings corresponding to various possible types of inquiries. Continuing with this example, the additional layer of the neural network or the model may then determine a type of inquiry corresponding to the message based on a measure of similarity (e.g., a cosine similarity) between the embedding corresponding to the intent of the user and the additional embeddings. The intent extraction module 240 is further described below in conjunction with FIG. 3.

The mapping module 245 retrieves (e.g., as shown in step 320 of FIG. 3) a set of template responses associated with a business entity having a presence on the online messaging application 140 and maps (e.g., as shown in step 325 of FIG. 3) an intent of a user of the online messaging application 140 to a template response included among the set of template responses based on the intent of the user. As described above, the intent of the user may be extracted by the intent extraction module 240 by applying a set of natural language processing techniques to a message to be communicated from the user to the business entity. For example, if a message received from a user of the online messaging application 140 includes a question about a business entity's business hours for a particular day of the week, the extracted intent of the user may correspond to an inquiry about the business entity's business hours. In this example, the mapping module 245 may map the intent of the user to a template response associated with an inquiry about the business entity's business hours (e.g., a template response that includes the business entity's business hours for every day of the week).

In some embodiments, the mapping module 245 may map an intent of a user of the online messaging application 140 to a template response associated with a business entity using a machine-learning model (e.g., a convolutional neural network). For example, suppose that the intent of a user of the online messaging application 140 has been extracted by applying a set of natural language processing techniques to a message from the user to be communicated to a business entity having a presence on the online messaging application 140. In this example, the mapping module 245 may use a machine-learning model to map the intent of the user to a template response associated with the business entity based on a set of training data used to train the model, in which the set of training data is associated with one or more business entities having at least a threshold measure of similarity to the business entity. In the above example, the set of training data may include training data associated with the business entity, training data associated with business entities in an industry that is the same as or similar to that of the business entity, training data associated with business entities located in a geographic location that is the same as or similar to that of the business entity, etc. The functionality of the mapping module 245 is further described below in conjunction with FIG. 3.

The machine-learning module 250 may train one or more machine-learning models. In some embodiments, one or more of the models may be trained to extract an intent of a user of the online messaging application 140 by applying a set of natural language processing techniques to a message to be communicated from the user to a business entity having a presence on the online messaging application 140. In various embodiments, one or more of the models also or alternatively may be trained by the machine-learning module 250 to map an intent of a user of the online messaging application 140 to a template response included among a set of template responses associated with a business entity based on the intent of the user. The machine-learning module 250 may train the model(s) based on previous messages received by various business entities and responses to these messages provided by the business entities. For example, training data including messages previously communicated via the online messaging application 140 to multiple business entities from various users of the online messaging application 140 and their corresponding responses may be retrieved and used to train a machine-learning model. The functionality of the machine-learning module 250 is further described below in conjunction with FIG. 3.

The user interface generator 255 generates a chat user interface of the online messaging application 140 in which one or more messages included in a message thread between one or more users of the online messaging application 140 and/or one or more business entities having a presence on the online messaging application 140 may be displayed. Messages in a message thread may be presented in the chat user interface in chronological order (e.g., oldest to newest from top to bottom). The chat user interface also may include various types of information associated with each message (e.g., information identifying who composed each message, whether each message was successfully sent, etc.). For example, messages in a message thread may be presented chronologically within the chat user interface, in which the newest messages are presented at the bottom of the chat user interface and each message includes information identifying the user or business entity who composed the message (e.g., their name and/or their profile image) and a time at which the message was sent or received.

In some embodiments, a template response may be communicated (e.g., as shown in step 330 of FIG. 3) to an administrator of a user account for a business entity maintained in the online messaging application 140 via the chat user interface. In such embodiments, a request subsequently may or may not be received (e.g., as shown in step 335 of FIG. 3) from the administrator to send the template response for display to a user of the online messaging application 140. For example, a template response may be communicated to an administrator of an account associated with a business entity maintained in the online messaging application 140 as a suggested response to a message received from a user of the online messaging application 140. In this example, after reviewing the message and the template response, the administrator may approve of the template response and request that the template response be sent for display to the user. Alternatively, in the above example, the administrator may request to edit the template response or to create a custom response prior to requesting to send the edited or custom response for display to the user. In the above examples, the administrator may submit the request by interacting with various types of interactive elements included in the chat user interface (e.g., radio buttons, text boxes, etc.). The functionality of the user interface generator 255 is further described below in conjunction with FIGS. 3 and 4.

The application server 260 provides the software framework that the online messaging application 140 runs upon. The application server 260 may serve business logic to the online messaging application 140 through various protocols, including, but not limited, to HTTP, as well as through application programming interfaces (APIs). The application server 260 manages its own resources and also may perform additional functions, such as processing transactions, messaging, resource connection and pooling, and managing security tasks. In some embodiments, the application server 260 may use a communication protocol that enables near-real-time exchange of data between two or more client devices 110 (e.g., using Extensible Messaging and Presence Protocol (XMPP)). In some embodiments, the application server 260 is paired with the web server 265 (described below) while in other embodiments, the application server 260 includes the web server 265, forming a web application server.

The web server 265 links the online messaging application 140 via the network 120 to the one or more client devices 110, as well as to the one or more third-party systems 130. The web server 265 serves web pages, as well as other content, such as JAVA®, FLASH®, XML and so forth. The web server 265 may receive and route messages between the online messaging application 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

Figure 3:
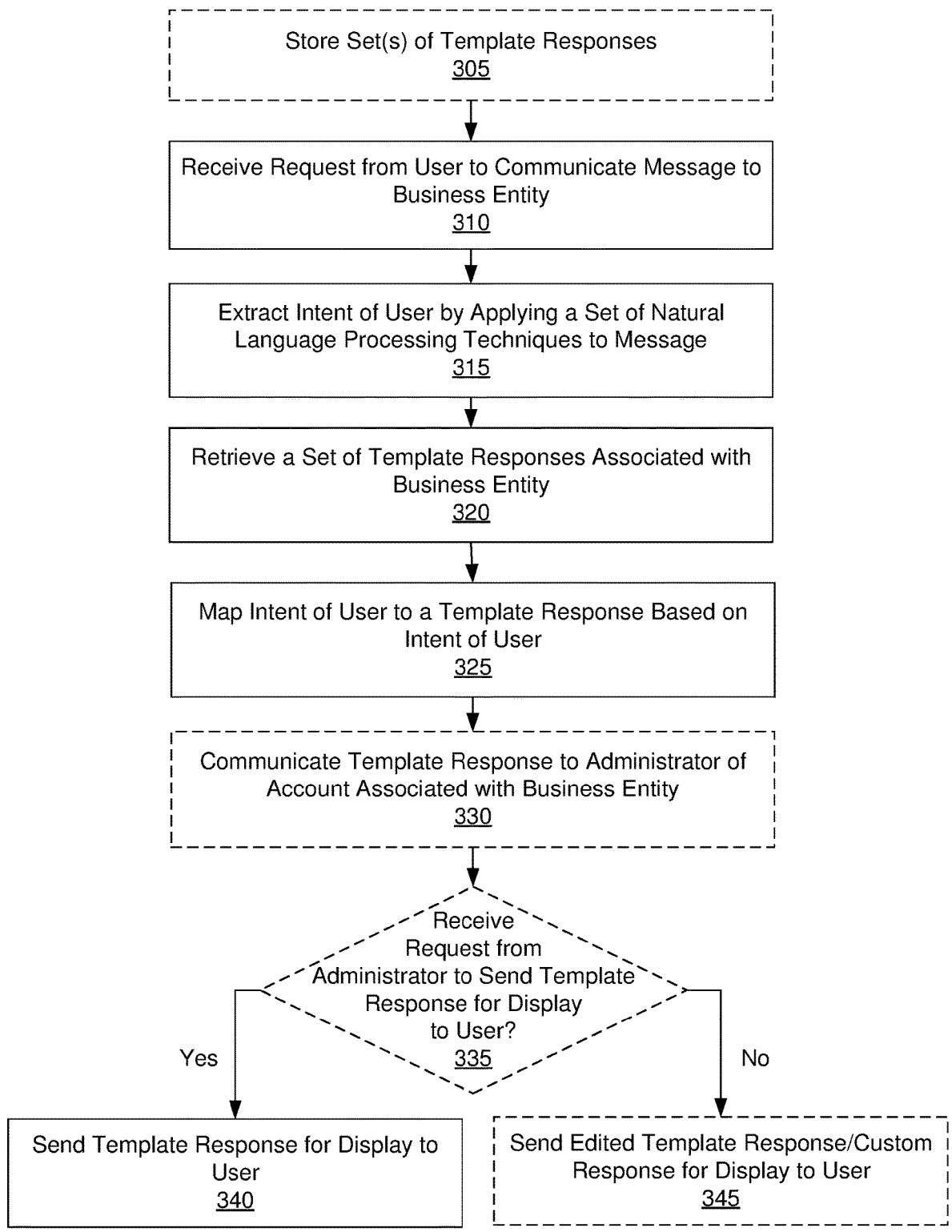
FIG. 3 is a flow chart of a method for automating a response to a message communicated to a business entity via an online messaging application, in accordance with an embodiment.

Automating a Response to a Message Communicated to a Business Entity Via an Online Messaging Application FIG. 3 is a flow chart of a method for automating a response to a message communicated to a business entity via an online messaging application. In other embodiments, the method may include different and/or additional steps than those shown in FIG. 3. Additionally, steps of the method may be performed in a different order than the order described in conjunction with FIG. 3.

In some embodiments, one or more sets of template responses associated with one or more business entities having a presence on the online messaging application 140 may be stored 305 (e.g., in the template store 230). As described above, each set of template responses may be stored 305 in association with information identifying a business entity with which it is associated and each template response may be associated with a type of inquiry to which an intent of a user of the online messaging application 140 may be mapped (e.g., inquiries about the business entity's business hours, products or services, contact information, return and exchange policy, etc.). As also described above, in some embodiments, one or more of the template responses may be generated by the online messaging application 140 and/or by a business entity. In such embodiments, the template response(s) may be generated based on various types of business information associated with the business entity (e.g., contact information, business hours, a catalog describing a set of services and/or a set of products provided by the business entity, etc.), which may be retrieved from various sources (e.g., a webpage associated with the business entity, a user profile associated with the business entity maintained in the user profile store 205, etc.). In some embodiments, the set(s) of template responses is/are stored 305 at the online messaging application 140. In alternative embodiments (e.g., in embodiments in which messages sent via the online messaging application 140 are encrypted), the set(s) of template responses is/are stored 305 at a client device 110 (e.g., a client device 110 associated with a user of the online messaging application 140 or a client device 110 associated with a business entity having a presence on the online messaging application 140).

A request is received 310 (e.g., using the application server 260 and/or the web server 265) to communicate a message via the online messaging application 140 from a user of the online messaging application 140 to a business entity having a presence on the online messaging application 140. The message may be included among additional messages in a message thread between the user and the business entity and presented in a chat user interface generated by the online messaging application 140 (e.g., using the user interface generator 225). In various embodiments, to protect the privacy of the user and/or the business entity, the message may be encrypted (e.g., via end-to-end encryption using cryptographic keys generated by the privacy protection module 235). In some embodiments, the request to communicate the message is received 310 at the online messaging application 140. In alternative embodiments (e.g., in embodiments in which the message is encrypted), the request to communicate the message is received 310 at a client device 110 (e.g., a client device 110 associated with the user or a client device 110 associated with the business entity).

An intent of the user is then extracted 315 (e.g., using the intent extraction module 240) by applying a set of natural language processing techniques to the message. In some embodiments, the intent of the user may be extracted 315 using a machine-learning model, such as a deep learning model (e.g., a convolutional neural network). In such embodiments, a set of inputs associated with the message (e.g., a set of embeddings corresponding to words in the message) may be provided to the model, which then determines a type of inquiry corresponding to the message. For example, a set of embeddings corresponding to the message may be generated using a word embedding algorithm (e.g., Word2Vec) and provided as a set of inputs to a neural network. In the above example, the neural network may predict a likelihood that the intent of the user corresponds to a particular type of inquiry. Alternatively, in the above example, the output of the neural network or the output of a layer of the neural network may be an embedding that corresponds to an intent of the user. In this example, an additional layer of the neural network or a different model may compare the embedding to additional embeddings corresponding to various possible types of inquiries. Continuing with this example, the additional layer of the neural network or the model may then determine a type of inquiry corresponding to the message based on a measure of similarity (e.g., a cosine similarity) between the embedding corresponding to the intent of the user and the additional embeddings. In some embodiments, the intent of the user is extracted 315 at the online messaging application 140. In alternative embodiments (e.g., in embodiments in which the message is encrypted), the intent of the user is extracted 315 at a client device 110 (e.g., a client device 110 associated with the user or a client device 110 associated with the business entity).

A set of template responses associated with the business entity is retrieved 320 (e.g., using the mapping module 245). In some embodiments, the set of template responses may be retrieved 320 from multiple sets of template responses associated with various business entities having a presence on the online messaging application 140. In such embodiments, the set of template responses that is retrieved 320 may be stored 305 in association with information identifying the business entity. In some embodiments, the set of template responses is retrieved 320 at the online messaging application 140. In alternative embodiments (e.g., in embodiments in which the message is encrypted), the set of template responses is retrieved 320 at a client device 110 (e.g., a client device 110 associated with the user or a client device 110 associated with the business entity).

The intent of the user is then mapped 325 (e.g., using the mapping module 245) to a template response included among the set of template responses based on the intent of the user. For example, suppose that the message received 310 from the user includes a question about the business entity's business hours for a particular day of the week, such that the extracted intent of the user corresponds to an inquiry about the business entity's business hours. In this example, the intent of the user may be mapped 325 to a template response associated with an inquiry about the business entity's business hours (e.g., a template response that includes the business entity's business hours for every day of the week).

In some embodiments, the intent of the user may be mapped 325 to a template response associated with the business entity using a machine-learning model (e.g., a convolutional neural network). For example, suppose that the intent of the user has been extracted 315 by applying a set of natural language processing techniques to the message received 310 from the user to be communicated to the business entity. In this example, a machine-learning model may be used to map 325 the intent of the user to a template response associated with the business entity based on a set of training data used to train the model (e.g., using the machine-learning module 250), in which the set of training data is associated with one or more business entities having at least a threshold measure of similarity to the business entity. In the above example, the set of training data may include training data associated with the business entity, training data associated with business entities in an industry that is the same as or similar to that of the business entity, training data associated with business entities located in a geographic location that is the same as or similar to that of the business entity, etc. In some embodiments, the intent of the user is mapped 325 to the template response at the online messaging application 140. In alternative embodiments (e.g., in embodiments in which the message is encrypted), the intent of the user is mapped 325 to the template response at a client device 110 (e.g., a client device 110 associated with the user or a client device 110 associated with the business entity).

In some embodiments, once the intent of the user is mapped 325 to a template response, the template response is then sent 340 (e.g., using the application server 260 and/or the web server 265) for display to the user (e.g., in the chat user interface), such that this process may be fully automated. In some embodiments, the template response is sent 340 for display to the user by the online messaging application 140. In alternative embodiments (e.g., in embodiments in which the message is encrypted), the template response is sent 340 for display to the user by a client device 110 (e.g., a client device 110 associated with the user or a client device 110 associated with the business entity).

Figure 4:
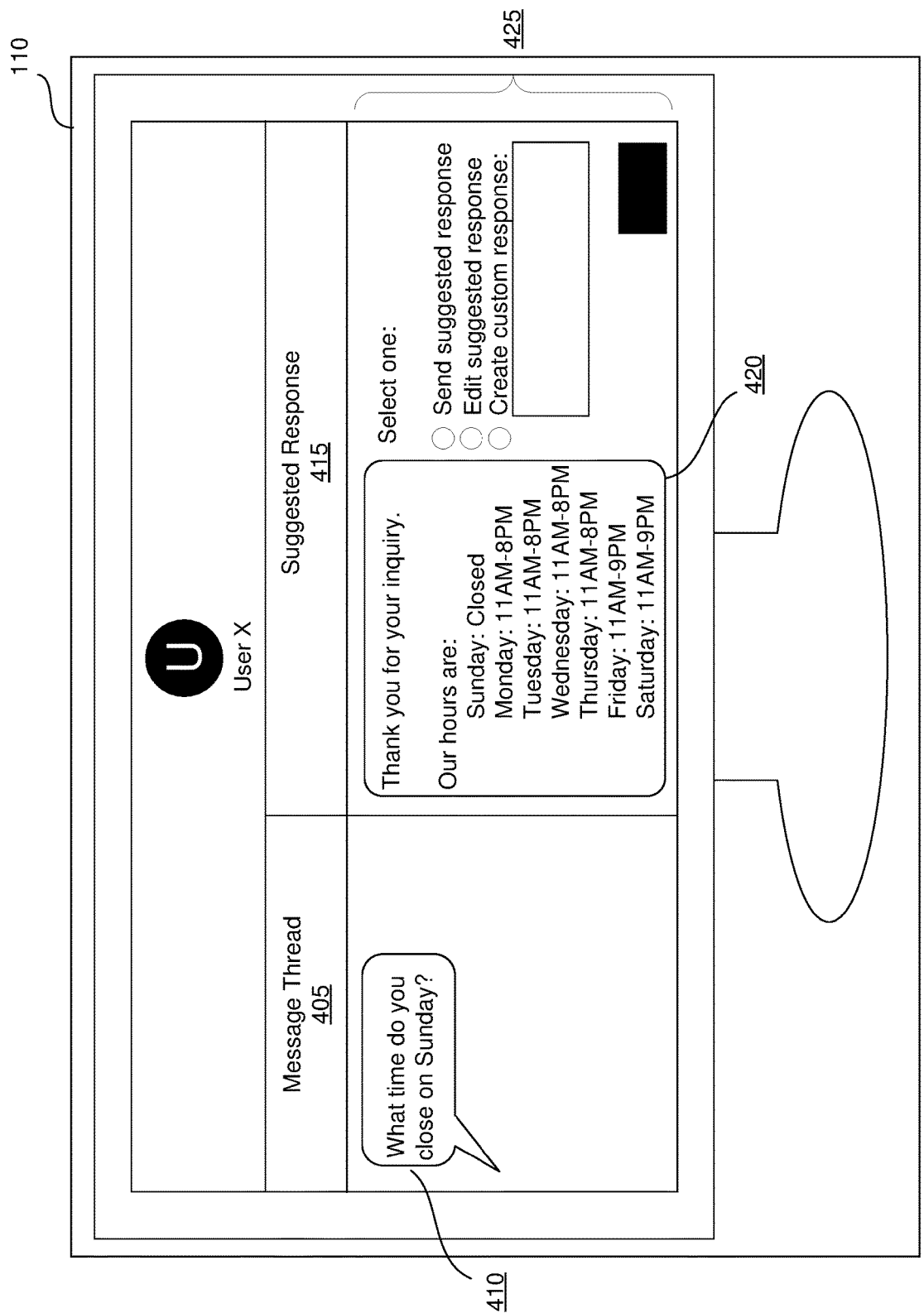
FIG. 4 is an example of a user interface capable of receiving a request to send a template response to a message communicated to a business entity via an online messaging application, in accordance with an embodiment.

In some embodiments in which this process is not fully automated, the template response to which the intent of the user is mapped 325 may be communicated 330 (e.g., using the application server 260 and/or the web server 265) to an administrator of an account associated with the business entity maintained in the online messaging application 140. For example, as shown in FIG. 4, which illustrates a chat user interface (e.g., generated using the user interface generator 255), suppose that the message 410 (i.e., "What time do you close on Sunday?") is a first message in a message thread 405 between the user and the business entity. In this example, the message thread 405 and a template response 420 that includes business hours for the business entity may be communicated 330 to the administrator as a suggested response 415 via a chat user interface presented in a display area of a client device 110 associated with the business entity. In some embodiments, the template response is communicated 330 to the administrator by the online messaging application 140. In alternative embodiments (e.g., in embodiments in which the message is encrypted), the template response is communicated 330 to the administrator by a client device 110 (e.g., a client device 110 associated with the user or a client device 110 associated with the business entity).

Referring again to FIG. 3, in embodiments in which the template response to which the intent of the user is mapped 325 is communicated 330 to the administrator of the account associated with the business entity, a request to send the template response for display to the user may be received 335 from the administrator. As shown in the example of FIG. 4, after reviewing the message 410 and the template response 420, the administrator may select from multiple options 425 associated with the template response 420 (e.g., send the suggested response, edit the suggested response, or create a custom response). In this example, the administrator may approve of the template response 420 and request that the template response 420 be sent for display to the user by selecting a radio button associated with the option to send the suggested response and by clicking on a button to submit the selected option. In some embodiments, the request to send the template response for display to the user may be received 335 at the online messaging application 140. In alternative embodiments (e.g., in embodiments in which the message is encrypted), the request to perform the action associated with the template response may be received 335 at a client device 110 (e.g., a client device 110 associated with the user or a client device 110 associated with the business entity).

Referring once more to FIG. 3, in embodiments in which a request is received 335 from the administrator to send the template response for display to the user, the template response is then sent 340 (e.g., using the application server 260 and/or the web server 265) for display to the user. As described above, in some embodiments, the template response is sent 340 for display to the user by the online messaging application 140. As also described above, in alternative embodiments (e.g., in embodiments in which the message is encrypted), the template response is sent 340 for display to the user by a client device 110 (e.g., a client device 110 associated with the user or a client device 110 associated with the business entity).

In embodiments in which the template response is communicated 330 (e.g., using the application server 260 and/or the web server 265) to the administrator of the account associated with the business entity, but a request is not received 335 from the administrator to send the template response for display to the user, an edited template response or a custom response may be sent 345 for display to the user. Referring back to FIG. 4, the administrator may not approve of the template response 420 and may instead request that an edited response or a custom response be sent for display to the user. The administrator may edit the template response 420 by selecting a radio button associated with the option to edit the suggested response, editing the suggested response, and clicking on the button to submit the selected option. Alternatively, in the above example, the administrator may instead request that a custom response be sent for display to the user by selecting a radio button associated with the option to create a custom response, creating the custom response, and clicking on the button to submit the selected option. In some embodiments, the edited template response or the custom response may be sent 345 for display to the user by the online messaging application 140. In alternative embodiments (e.g., in embodiments in which the message is encrypted), the edited template response or the custom response may be sent 345 for display to the user by a client device 110 (e.g., a client device 110 associated with the user or a client device 110 associated with the business entity).

The flowchart and accompanying examples above have been described in the context of responding to a message communicated to a business entity via the online messaging application 140. However, in various embodiments, the process described above may be adapted to respond to messages communicated to other types of entities having a presence on the online messaging application 140. For example, the process may be adapted to respond to a message communicated to an organization (e.g., a non-profit organization, a governmental organization, etc.), an institution (e.g., an educational institution), an establishment (e.g., a religious establishment), or any other suitable type of entity that may have a presence on the online messaging application 140.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, from a messaging platform over a network at a device associated with a business entity that is a third party system communicating with the messaging platform, a request to communicate a message from a user of an online messaging application to the business entity having a presence on the online messaging application, the request routed to the device associated with the business entity wherein the user is associated with a user profile on the online messaging application, and wherein the business entity is associated with a user profile on the online messaging application;
   decrypting the received request by the device associated with the business entity;
   extracting, at the device associated with a business entity, an intent of the user by applying at least one of a machine-leaning model and a set of natural language processing techniques to the decrypted message;
   retrieving a set of template responses associated with the business entity;
   mapping, at the device associated with a business entity, the intent of the user to a template response of the set of template responses based at least in part on the intent of the user;
   generating a response to the message from the user based on the template response and based on information from the user profile of the business entity;
   communicating the response generated based on the template response to an administrator of an account associated with the business entity maintained in the online messaging application for approval;
   receiving a custom response from the administrator of the account associated with the business entity in place of the generated response in response to the administrator not approving the generated response;
   encrypting the custom response by the device associated with the business entity; and
   sending the encrypted custom response for display to the user to the messaging platform over the network from the device associated with the business entity.

2. The method of claim 1, wherein a second machine-learning model is used to perform the mapping the intent of the user to the template response of the set of template responses based at least in part on the intent of the user.

3. The method of claim 1, wherein the machine-learning model corresponds to a convolutional neural network.

4. The method of claim 1, further comprising:
   retrieving a plurality of messages communicated to a set of business entities having a presence on the online messaging application;
   retrieving a plurality of responses from the set of business entities to the plurality of messages; and
   training the machine-learning model based at least in part on the plurality of messages and the plurality of responses.

5. The method of claim 4, wherein the set of business entities comprises one or more of: the business entity and a set of business entities having at least a threshold measure of similarity to the business entity.

6. The method of claim 1, wherein mapping the intent of the user to the template response of the set of template responses comprises:
   generating a set of embeddings corresponding to the message;
   determining a type of inquiry corresponding to the message based at least in part on the set of embeddings; and
   mapping the intent of the user to the template based at least in part on the type of inquiry.

7. The method of claim 6, further comprising:
   providing an input comprising the set of embeddings to a machine-learning model, the machine-learning model trained to map the message to the template response based at least in part on the set of embeddings; and
   receiving an output comprising the template response from the machine-learning model.

8. The method of claim 1, wherein:
   the information from the user profile of the business entity comprises a set of business information associated with the business entity; and
   the response is generated based on the set of business information.

9. The method of claim 8, wherein the set of business information is selected from the group consisting of: a set of contact information, a set of business hours, and a catalog, wherein the catalog comprises a description of one or more of: a set of services and a set of products.

10. A computer program product comprising a non-transitory, computer readable storage medium having instructions encoded thereon that, when executed by a processor, cause the processor to:
    receive, from a messaging platform over a network at a device associated with a business entity that is a third party system communicating with the messaging platform, a request to communicate a message from a user of an online messaging application to the business entity having a presence on the online messaging application, the request routed to the device associated with the business entity wherein the user is associated with a user profile on the online messaging application, and wherein the business entity is associated with a user profile on the online messaging application;
    decrypt the received request by the device associated with the business entity;
    extract, at the device associated with a business entity, an intent of the user by applying at least one of a machine-leaning model and a set of natural language processing techniques to the decrypted message;
    retrieve a set of template responses associated with the business entity;
    map, at the device associated with a business entity, the intent of the user to a template response of the set of template responses based at least in part on the intent of the user;

generate a response to the message from the user based on the template response and based on information from the user profile of the business entity;

communicate the response generated based on the template response to an administrator of an account associated with the business entity maintained in the online messaging application for approval;

receive a custom response from the administrator of the account associated with the business entity in place of the generated response in response to the administrator not approving the generated response;

encrypt the custom response by the device associated with the business entity; and send the encrypted custom response for display to the user to the messaging platform over the network from the device associated with the business entity.

11. The computer program product of claim 10, wherein a second machine-learning model is used to perform the mapping the intent of the user to the template response of the set of template responses based at least in part on the intent of the user.

12. The computer program product of claim 10, wherein the machine-learning model corresponds to a convolutional neural network.

13. The computer program product of claim 10, wherein the computer-readable storage medium further has instructions encoded thereon that, when executed by the processor, cause the processor to:

retrieve a plurality of messages communicated to a set of business entities having a presence on the online messaging application;

retrieve a plurality of responses from the set of business entities to the plurality of messages; and train the machine-learning model based at least in part on the plurality of messages and the plurality of responses.

14. The computer program product of claim 13, wherein the set of business entities comprises one or more of: the business entity and a set of business entities having at least a threshold measure of similarity to the business entity.

15. The computer program product of claim 10, wherein map the intent of the user to the template response of the set of template responses comprises:

generate a set of embeddings corresponding to the message;

determine a type of inquiry corresponding to the message based at least in part on the set of embeddings; and map the intent of the user to the template based at least in part on the type of inquiry.

16. The computer program product of claim 15, wherein the computer-readable storage medium further has instructions encoded thereon that, when executed by the processor, cause the processor to:

provide an input comprising the set of embeddings to a machine-learning model, the machine-learning model trained to map the message to the template response based at least in part on the set of embeddings; and receive an output comprising the template response from the machine-learning model.

17. The computer program product of claim 10, wherein the computer-readable storage medium further has instructions encoded thereon that, when executed by the processor, cause the processor to:

retrieve a set of business information associated with the business entity; and generate the set of template responses based at least in part on the set of business information.

18. The computer program product of claim 17, wherein the set of business information is selected from the group consisting of: a set of contact information, a set of business hours, and a catalog, wherein the catalog comprises a description of one or more of: a set of services and a set of products.

19. The method of claim 1, further comprising:

sending the response for display to the user in response to receiving approval from the administrator to send the response for display to the user.

20. The computer program product of claim 10, wherein the computer-readable storage medium further has instructions encoded thereon that, when executed by the processor, cause the processor to:

send the response for display to the user in response to receiving approval from the administrator to send the response for display to the user.

* * * * *

UNITED STATES PATENT AND TRADEMARK OFFICE
CERTIFICATE OF CORRECTION

| | |
|---|---|
| PATENT NO. | : 11,303,588 B1 |
| APPLICATION NO. | : 16/562209 |
| DATED | : April 12, 2022 |
| INVENTOR(S) | : Vibhor Rastogi |

It is certified that error appears in the above-identified patent and that said Letters Patent is hereby corrected as shown below:

In the Claims

In Column 15, Claim 1, Line 38, delete "machine-leaning" and insert -- machine-learning --, therefor.

In Column 16, Claim 10, Lines 59-60, delete "machine-leaning" and insert -- machine-learning --, therefor.

Signed and Sealed this
Twelfth Day of July, 2022

Katherine Kelly Vidal
*Director of the United States Patent and Trademark Office*